May 1, 1945. W. E. CRAWFORD 2,374,733
CONNECTION FOR LINED TANKS
Filed April 30, 1942
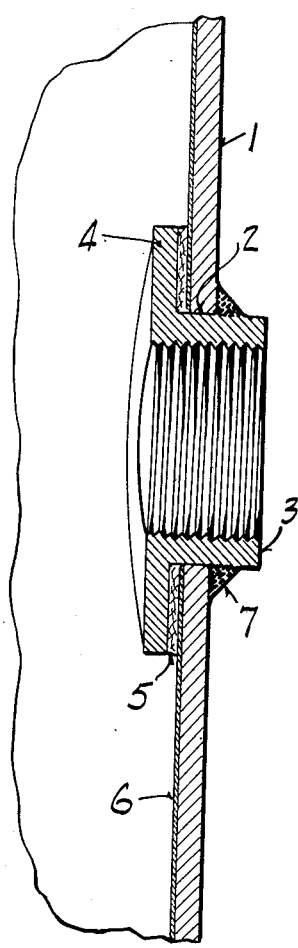
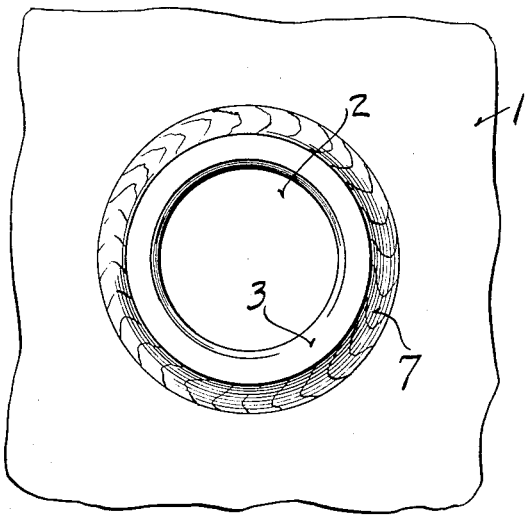
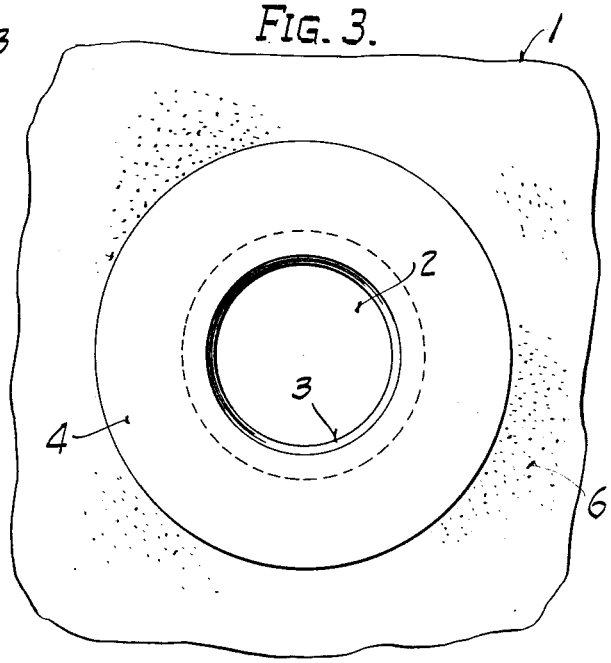
William E. Crawford
INVENTOR.
BY
ATTORNEY.

Patented May 1, 1945

2,374,733

UNITED STATES PATENT OFFICE 2,374,733

CONNECTION FOR LINED TANKS

William E. Crawford, Wauwatosa, Wis., assignor to A. O. Smith Corporation, Milwaukee, Wis., a corporation of New York Application April 30, 1942, Serial No. 441,085

4 Claims. (Cl. 285—49)

This invention relates to a connection for tubular members and more particularly to a connection to be employed with a hot water storage tank that is lined with ceramic enamel or other corrosion resistant material to protect the interior surface of the tank from corrosion by the contained fluid in service.

One object of the present invention is to provide an efficient construction and arrangement of a hot water tank connection that is simple and cheap to construct and in which circulation of contained fluid to exposed metal is effectively prevented.

Another object is to provide a tank connection that prevents leakage to the metal at the opening in which the connection is secured, by eliminating injury to the lining of the tank disposed at the outer circumferential portion of the interior part of the connection.

A further object is to provide a connection which can be applied after enameling of the tank.

Other objects will appear from the following description of an embodiment of the invention illustrated in the accompanying drawing:

In the drawing:

Figure 1 is a longitudinal section of a portion of a tank shell and tank connection;

Fig. 2 is an outer end view of the connection as applied to the tank; and

Fig. 3 is an inner end view of the connection as applied to the tank.

According to the invention the tubular connection is flanged at its inner end and inserted from the inside through an opening in the shell of the tank, with a packing washer between the flange and the enamel lining of the tank, and then welded around the body of the connection on the outside of the tank. The flange and washer extend radially outward from the body of the connection to overlap and cover up any portion of the enamel that might be injured from the welding operation.

Referring to the drawing the sheet metal shell 1 has an opening 2 in which is disposed the tubular body or spud 3 of the connection. The connection has a flange 4 at its inner end pressed tightly against the wall of the shell with a gasket 5 of asbestos or other suitable material disposed therebetween. The shell has a vitreous or ceramic enamel lining 6 which extends beneath the gasket to the edge of the opening 2.

The body 3 of the connection extends through the wall of the tank for a substantial distance and a fillet weld 7 of deposited metal secures the connection to the tank with the gasket 5 tightly confined between the flange 4 and enamel lining 6. The body 3 may be internally threaded for connecting a pipe thereto.

The spud 3 of the connection is preferably made of corrosion resistant alloy or other corrosion resistant metal suitable to resist corrosive action by the fluid contained in the tank in service. The material of the spud must also be suitable for welding to the tank.

In assembling the connection with a hot water storage tank, the shell 1 is first fabricated into a generally cylindrical shape from suitable metal and is then provided with the opening 2 of sufficient size to receive the connection provided by the invention.

Ceramic enamel is next applied and fused to the interior surface of the shell 1 including the surface immediately adjacent the opening 2. The fusion of the ceramic enamel provides the lining 6 which protects the interior surface of the tank from corrosion by the fluid in the tank. Other suitable material may be employed for the lining 6 instead of the ceramic enamel described.

The spud 3 is next made with a sufficient diameter to be inserted within the opening 2 and to fit tightly against the edge of the opening in the wall of the shell. The flange 4 of spud 3 is also constructed to conform to the curvature of the shell so that assembly of the two members together as described may properly be made.

The gasket 5 is then slipped over the unflanged end of the spud 3 and moved over the outer surface of the spud to engage the flange 4. By working through one end of the shell 1, the spud 3 carrying the gasket 5 as described is disposed within the opening 2 of the shell. In this position the outer end of the spud projects outside the tank a slight distance, the body of the spud tightly engages the edge of the opening 2 and the flange 4 overlaps a substantial area of the interior surface of the wall of the shell with the gasket 5 pressed tightly between the flange and shell wall.

While the flange 4 is held firmly pressed towards the wall of the shell, the body portion of the spud is welded to the outer surface of the wall of the shell at the edge of the opening 2 by the weld 7. Electric arc welding is preferably employed in making the weld 7, although other ways of securing the connection to the tank may be utilized. The weld 7 is readily made around the body of the spud to provide ready assembly of the connection with a shell having considerable curvature in its cylindrical extent.

The welding of the spud 3 to the shell confines the gasket 5 in the area between the flange 4 of the spud and the wall of the shell. Fluid contained in the tank in service is prevented by the gasket 5 from circulating to the metal disposed at the opening 2. In the welding of the spud 3 to the tank wall or in threading attachments therein, there is likelihood of injury to the enamel lining 6 immediately adjacent the edges of the opening 2. If injury occurs the present invention prevents exposure of the metal of the shell to the corrosive action of fluid contained in the tank.

Once the gasket employed becomes saturated with the contents of the tank and small amounts of products of corrosion, circulation of fluid to the weld metal 7 or to any exposed metal at the joint between the connection and shell is substantially eliminated. The weld 7 retains the gasket and makes connection to the tank wall and seals the tank against leakage at the connection.

In addition the substantial extent of the gasket and flange insures that no injury by the welding of the spud to the tank or by the threading of a pipe into the connection will occur to the lining of the tank at the outer circumference of the flange. The lining in that area is so far removed from the edge of the opening 2 that it is not subject to injury by any assembly operations performed at the opening. This eliminates the danger of cracks developing in the lining 6 in the region of the outer circumference of the flange 4 and the consequent contact of fluid through such cracks with the metal of the tank.

By employing a weld to seal the connection to the tank wall it is simple and economical to assemble the connection with a shell of substantial curvature. The flange 4, being integral with the connection will not become loose or fall away in service and the metal at the joint is thereby permanently protected. The invention also permits assembly of the connection with the shell of a hot water tank after the shell has been lined with enamel without danger of leakage developing between the connection and shell by injury to the lining.

The connection is adapted to be applied to the heads as well as the shells of hot water tanks and in addition may be utilized in any lined tubular members.

Various embodiments of the invention may be employed within the scope of the accompanying claims.

The invention is claimed as follows:

1. A connection for a sheet metal member having a corrosion resistant lining to protect the same from corrosion and an opening therein to receive a connection, said connection comprising a corrosion resistant tubular spud disposed in said opening, a flange integral with the inner end of said spud extending radially therefrom for a substantial distance to overlap a generally large area of the lined surface of the member adjacent and around the opening therein, corrosion resistant filler material confined between said flange and the lining of the member to retard circulation of fluid to the metal near the edge of the opening, and a circumferential weld joining the projecting outer end of the spud to the outer surface of the member to secure the spud in place and prevent the escape of fluid between the spud and member, said flange and filler material covering an area of said lining beyond the portion thereof injured by the welding operation.

2. A connection for the shell of a hot water storage tank lined on the inside with a ceramic enamel or the like to protect the same from corrosion in service, comprising a tubular spud of corrosion resistant metal fitting in an opening in the wall of said shell, a flange integral with the inner end of said spud extending radially therefrom for a substantial distance to overlap a generally large area of the lined surface of the shell adjacent and around the opening therein, corrosion resistant filler material confined between said flange and the lining of the shell to retard circulation of fluid to the metal of the shell near the edge of the opening, and a circumferential weld joining the projecting outer end of the spud to the outer surface of the shell to secure the spud in place and prevent the escape of fluid between the spud and shell, said flange and filler material covering an area of said ceramic enamel lining surrounding the portion thereof immediately affected by the weld.

3. A connection for the shell of a hot water storage tank lined on the inside with a ceramic enamel or the like to protect the same from corrosion in service, comprising a tubular spud of corrosion resistant metal disposed in an opening in the wall of the shell, a flange integral with the inner end of said spud extending radially therefrom for a substantial distance to overlap a generally large area of the lined surface of the shell adjacent and around the opening therein, said flange being constructed to fit the curvature of the shell, a circumferential weld joining the outwardly projecting end of the spud to the outer surface of the shell to secure the spud in place and prevent the escape of fluid between the spud and shell, and a corrosion resistant gasket confined between said flange and the lining of the shell to prevent circulation of fluid to the metal disposed near the edge of the opening, said flange and gasket covering an area of said ceramic enamel lining surrounding the portion thereof immediately affected by the weld.

4. A pipe connection for a lined tank, comprising an internally threaded tubular member inserted in an opening in the tank wall, a flange integral with the inner end of the member and curved complementary to the wall of the tank adjacent the opening to overlap the lining of the tank for a substantial distance radially from the opening, a weld joining the member to the tank wall on the outside of the latter, and material disposed between the flange and the tank wall to protect the metal at the edge of the opening and beneath the flange from attack by the contents of the tank, said flange and material tightly covering an area of said lining extending radially beyond the portion thereof immediately affected by the weld.

WILLIAM E. CRAWFORD.